United States Patent
Espiard et al.

(10) Patent No.: US 7,887,908 B2
(45) Date of Patent: Feb. 15, 2011

(54) INSULATION PRODUCT, SUCH AS A THERMAL INSULATION PRODUCT, AND PRODUCTION METHOD THEREOF

(75) Inventors: Philippe Espiard, Gouvieux (FR); Bruno Mahieuxe, Neuilly sous Clermont (FR)

(73) Assignee: Saint-Gobain Isover, Courbevoie (FR)

( * ) Notice: Subject to any disclaimer, the term of this patent is extended or adjusted under 35 U.S.C. 154(b) by 1475 days.

(21) Appl. No.: 10/519,683

(22) PCT Filed: Jul. 9, 2003

(86) PCT No.: PCT/FR03/02139

§ 371 (c)(1),
(2), (4) Date: Aug. 31, 2005

(87) PCT Pub. No.: WO2004/007395

PCT Pub. Date: Jan. 22, 2004

(65) Prior Publication Data

US 2006/0005580 A1    Jan. 12, 2006

(30) Foreign Application Priority Data

Jul. 12, 2002 (FR) .................................. 02 08873

(51) Int. Cl.
*D04H 1/00* (2006.01)
*B05D 3/02* (2006.01)
(52) U.S. Cl. ..................... 428/292.1; 427/386
(58) Field of Classification Search ............... 428/292.1
See application file for complete search history.

(56) References Cited

U.S. PATENT DOCUMENTS

| 4,501,787 | A  | * | 2/1985  | Marchetti et al. ........... 442/232 |
| 5,968,645 | A  | * | 10/1999 | Caccini et al. .............. 428/332 |
| 6,329,473 | B1 | * | 12/2001 | Marten et al. ............... 525/438 |
| 2007/0077425 | A1 | * | 4/2007 | Espiard et al. .............. 428/375 |

FOREIGN PATENT DOCUMENTS

| DE | 43 25 267 | 7/1994 |
| EP | 0 148 050 | 7/1985 |
| EP | 0 369 848 | 5/1990 |
| EP | 0 539 290 | 4/1993 |
| EP | 0 633 295 | 1/1995 |
| NL | 8 003 965 | 2/1982 |
| SU | 541 826 | 2/1977 |

OTHER PUBLICATIONS

U.S. Appl. No. 10/578,571, filed May 5, 2006, Espiard.

* cited by examiner

*Primary Examiner*—D. Lawrence Tarazano
*Assistant Examiner*—Carrie S Thompson
(74) *Attorney, Agent, or Firm*—Oblon, Spivak, McClelland, Maier & Neustadt, L.L.P.

(57) ABSTRACT

The invention relates to a thermal and/or acoustic insulation product based on mineral fibers for use above 150° C., especially between 200 and 500° C., or even up to 700° C. and higher in the case of rock fibers, which comprises at least 1%, or at least 2% and even more than 4% by weight of binder obtained from a sizing composition, the resin or resin mixture of which consists substantially of at least one epoxy-type resin whose EEW value is between 150 and 2000, preferably at least 160 and/or at most 700, or even at least 170 and/or at most 300.

14 Claims, No Drawings

INSULATION PRODUCT, SUCH AS A THERMAL INSULATION PRODUCT, AND PRODUCTION METHOD THEREOF

The present application is a U.S. National Stage Application, under 35 U.S.C. §371, of International Application No. PCT/FR2003/002139, filed on Jul. 9, 2003 and published as WO 2004/007395, and which claims priority to French Application No. 02/08873, filed on Jul. 12, 2002.

The invention relates to the use of a novel type of synthetic resin for producing mineral-fiber-based products that can be used at high temperature (above 150° C., especially 200 to 500° C., or even up to 700° C. and higher for certain mineral fibers), especially those based on glass fibers or rock fibers, such as for example mineral fiber mats intended for thermal and/or acoustic insulation of buildings or equipment.

Most insulating materials based on mineral fibers include a binder that ensures mechanical integrity of the material, that is to say binds the fibers together. This binder must be dispersed uniformly over the fibers in order to prevent the formation of fiber islands surrounded by a binder gangue in a collection of fibers that are unbonded, more brittle and therefore generate more dust.

It is known to use phenoplast (phenol-formaldehyde) or aminoplast (melamine-formaldehyde or urea-formaldehyde) thermosetting resins. The resins most commonly used are resols, namely products of the condensation, in the presence of alkali metal or alkaline-earth metal catalysts, of phenols carrying vacant ortho and para positions and aldehydes (mainly formaldehyde). These resins are used in a sizing composition that also contains water, as dilution agent, urea, that serves to reduce the amount of free formaldehyde and also acts as a binder, and various additives such as oil, aqueous ammonia, colorants and possibly fillers.

For applications in which the mineral-fiber-based product may be subjected to high temperatures, especially above 150° C., in particular above 200° C., or even above 300° C. and even sometimes above 400° C., conventional phenoplast-type binders are unsatisfactory as they decompose and generate gaseous emissions that may be undesirable, especially formaldehyde, methyl isocyanate (denoted hereafter by MIC) and/or isocyanic acid (denoted hereafter by ICA) and/or other volatile organic compounds (denoted hereafter by VOC). In fact, MIC and ICA emissions start to be detected above 150° C. and become significant beyond 200° C. when products manufactured with conventional phenoplast-type binders are heated.

To reduce MIC emissions with phenoplast-type resins, it has been proposed to use sizing compositions based on a phenol-formaldehyde resin substantially free of urea or of urea derivatives, as the Applicant has described in European patent application EP 1 022 263. This solution makes it possible for the MIC emissions liable to occur when the product is heated to be very substantially reduced, but is not completely satisfactory as it results in inferior trapping of the formaldehyde emitted during manufacture of the product compared with a conventional sizing composition (for example of the type of those described in the Applicant's patent EP 0 480 778).

Another means for solving the problem of emissions is known and consists in using mineral binders instead of binders based on organic resins. These mineral binders advantageously solve the problem of undesirable gas emission up to 500° C., or even up to 700° C., but have considerable drawbacks that limit their use. Binders based on aluminum phosphate are suitable for this use, especially those sold by the Italian company Poletto under the brand name LEGAREFF.

Firstly, such products are sometimes difficult to manufacture as it is noted that there is a significant tendency of bonding to the line, especially to the conveyor belts.

Secondly, the mechanical quality of the insulating product obtained with such binders is very inferior to that of products obtained with phenoplast binders. This is because it is noted that the mineral binder is sensitive to moisture and it is frequently observed that the product swells during its storage. Furthermore, substantial delamination is observed in the product and there are risks of part of the product being torn off during handling.

It should be pointed out that applications of fibrous insulation capable of withstanding the high temperatures mentioned occur, for example, in the oven (especially domestic electric oven) field, the lagging field (especially the lagging of pipes in which the insulation is used in the form of a shell), the fire protection field (for example fire doors), the transportation field and the nuclear field.

It is apparent that, to produce end products, such applications require steps of handling, shaping and adjustment of the insulating products used.

The use of insulating products comprising a mineral binder results in much more difficult processing than with insulating products comprising a binder based on an organic resin, and often results in high scrap rates.

It is an object of the invention to select a type of synthetic organic resin for producing mineral-fiber-based products, said product being able to be used above 150° C., especially between 200 and 500° or even up to 700° C. and higher in the case of rock fibers, while considerably reducing undesirable gas emission compared with the known solutions of the prior art.

It should be noted that the use of insulating products based on glass fibers, especially those having a soda-lime borosilicate composition, is limited to temperatures of about 500° C., whereas it is possible to use rock-fiber-based products, which in general comprise a low content of alkali metals, up to 750° C. or indeed at even higher temperatures.

There are a very large number of criteria for selecting a binder, and these fall within various categories; however, it should not be forgotten that a binder must above all adhere to the glass correctly.

Firstly, it is essential for the binder to be rheologically compatible with the fiber manufacturing process. Without entering into details that are irrelevant here, we point out that glass fibers are usually produced by means of a spinner whose axis is oriented vertically and into which a continuous stream of molten glass is introduced. The glass is thrown against the peripheral wall of the spinner, from which it escapes in the form of filaments via a very large number of small holes, said filaments being attenuated and carried away downward by means of a high-temperature, high-pressure gas stream. The fibers obtained are collected on a gas-permeable conveyor and thus form a blanket of greater or lesser thickness spending on the speed of the conveyor. In the case of rock fibers, the fibers are usually produced with a spinner having a horizontal axis.

The sizing composition must be distributed over the fiber thus produced, in order thereafter to preferably be located at the junction points between fibers and to allow an elastic fibrous blanket to be obtained; it is therefore preferable to spray the sizing composition while the fibers are still individual fibers, that is to say before the blanket forms. Consequently, the sizing composition is sprayed into the fiber collection hopper, beneath the burners that generate the gas attenuation stream. The corollary of this option is to preclude the use of inflammable and/or contaminating organic solvents for the formulation of the sizing composition, the risk of fire and/or contamination in the collection hopper being too great. In addition, the resin serving as binder must not cure too rapidly before the desired forming operation.

Secondly, although this curing must not be too rapid, it must however not be able to be too lengthy (risk of pregelling), since complete curing must be completed in a time compatible with high production rates after residence in a high-temperature oven (at around 250° C.).

Finally, the resin and its method of use must be relatively inexpensive, compatible with that of fiberizing the glass, and must not lead, directly or indirectly, to the formation of undesirable or contaminating effluents.

These objectives are achieved by using a sizing composition, the resin of which consists substantially of at least one epoxy-type resin. The epoxy resins selected by the invention are resins whose EEW value (Epoxy Equivalent Weight, a parameter known to those skilled in the art, corresponding to the weight of resin in grams per mol of epoxy functional group) is between 150 and 2000, preferably at least 160 and/or at most 700, or even at least 170 and/or at most 300. This is because the inventors have demonstrated that these resins advantageously make it possible to obtain very low levels of undesirable gases emitted and are compatible with the known methods for spraying a sizing composition that are used in the mineral fiber industry for fibers intended for insulation. The thermal and/or acoustic insulation products according to the invention comprise at least 1%, or at least 2% and even more than 4% by weight of cured binder from the sizing composition.

Thus, the ease of use of an organic resin (soluble or emulsifiable or dispersible in water and therefore easy to spray) is advantageously obtained. The insulating products manufactured with such resins can be easily handled and shaped. Surprisingly, these products generate no, or very little, undesirable gases during use above 150° C., especially between 200 and 500° C. or even up to 700° C. and higher in the case of rock fibers.

The term "undesirable gases" is understood to mean especially formaldehyde, MIC, ICA and other volatile organic compounds (VOCs).

For the purposes of the invention, the amount of gas emitted by a specimen of mineral-fiber-based insulation product comprising a binder and heated to 350° C., especially for at least 15 minutes, preferably 20 minutes, in particular 1 hour or more, is characterized, this being representative of the operation of the insulation for the intended applications. This is because it may be considered that, after residing for one hour at 350° C., almost all of the undesirable gases have been emitted. The amount of gas emitted normalized to the weight of product tested is measured. It will be considered that little undesirable gas is emitted if their amount measured in the above test is less than 50 mg/kg, preferably less than 20 mg/kg and even less than 10 mg/kg.

With the resins according to the invention, thermal and/or acoustic insulation products based on mineral fibers are obtained that can be used above 150° C., especially between 200 and 500° C. or even up to 700° C. and higher in the case of rock fibers and that comprise at least 1%, or at least 2% and even more than 4% by weight of cured organic resin, while still releasing less than 50 mg/kg (of product), especially less than 20 mg/kg and even less than 15 mg/kg of formaldehyde and less than 50 mg/kg (of product), especially less than 20 mg/kg and even less than 10 mg/kg of methyl isocyanate (MIC) when they are heated to 350° C. for at least 15 minutes.

A sizing composition according to the invention is obtained by diluting or emulsifying, in water, a resin or a resin mixture consisting substantially of at least one epoxy resin whose EEW value is between 150 and 2000, preferably at least 160 and/or at most 700, or even at least 170 and/or at most 300, with a nonvolatile amine hardener, and including additives calculated in parts by weight per 100 parts of dry resin. Preferably, 0.1 to 2 parts of silane and/or 0 to 15 parts of a mineral oil, in parts calculated per 100 parts of dry resin, are added.

The amine hardener is especially characterized by the amine/H equivalent weight defined by the MW ratio (molecular weight of the amine to the active hydrogen number). The preferred amines have an amine/H equivalent weight, denoted by "NH number", of between 20 and 300.

Among the epoxy resins of the invention, mention may be made of resins of the glycidyl ether type that are described in the Applicant's European patent EP 0 369 848.

The epoxy resins described in Application EP 0 369 848 are particularly advantageous. In this application, these resins are described as being beneficial in particular because they do not result, directly or indirectly, in the formation of undesirable or contaminating effluents during fiberizing and the subsequent oven treatments (at about 250° C.). However, nothing would have anticipated that such resins could allow the manufacture of products capable of being used above 150°, especially between 200 and 500° C., or even up to 700° C. and higher in the case of rock fibers, especially with very low MCI and ICA emissions.

Among epoxy resins of the glycidyl ether type, the following resins, cited with their brand names, have proved to be particularly appropriate:

resin in emulsion from Resolution: EPIREZ 3510 W60 (EEW=185 to 215), EPIREZ 3515 W60 (EEW=225-275) and EPIREZ 3522 W60 (EEW=615-715);

resin to be emulsified from Resolution: EPICOTE 828 (EEW=184 to 190) and EPICOTE 255 (EEW=193 to 205); and resin to be emulsified from Dow Chemical: DER330 (EEW=176-185) and DER 331 (EEW=182-192).

Other epoxy resins of the glycidyl ether type are particularly advantageous as they make it possible to give the product improved temperature and fire resistance. These are halogenated glycidyl-ether-type epoxy resins, especially derivatives of dibromophenyl glycidyl ether such as, for example, the following compounds:

dibromophenyl glycidyl ether, 2-methyl-4,6-dibromophenyl glycidyl ether, 4-methyl-2,6-dibromophenyl glycidyl ether, 2-butyl-4,6-dibromophenyl glycidyl ether, 4-isooctyl-2,6-dibromophenyl glycidyl ether, 2-phenyl-4,6-dibromophenyl glycidyl ether, 4-cumyl-2,6-dibromophenyl glycidyl ether.

Another family of epoxy resins also gives good results: these are novolac epoxy resins such as, for example, the resins EPIREZ 5003-W55 (EEW=195 to 215).

It is also possible and advantageous to use a mixture of the epoxy resins described above.

As regards the amine used as hardener, it is possible to use aliphatic, cycloaliphatic or aromatic amines, or imidazoles, polyfunctional hydrazides or dicyandiamides.

As examples according to the invention, mention may be made of:

aliphatic amines: diethylenetriamine, triethylenetetramine, tetraethylene pentamine (TEPA), such as EPI-CURE 3295 from Resolution, polyglycoldiamine and m-xylylenediamine;

cycloaliphatic amines: 1,3 bis(aminomethyl)-cyclohexane, 4,4-diaminocyclohexylmethane, methanediamine and 2,6-diaminocyclohexanols;

aromatic amines: metaphenylenediamine, diamino-diphenylsulfone and diethyltoluenediamine; and imidazoles, such as imidazole, 1-methylimidazole, 2-methylimidazole, 2-undecylimidazole, 2-ethyl-4-methylimidazole and 2-phenylimidazole.

The invention also relates to a thermal and/or acoustic insulation product based on mineral fibers, that can be used above 150° C., especially between 200 and 500° C., or even up to 700° C. and higher in the case of rock fibers, comprising at least 1%, or at least 2% and even more than 4% by weight of a binder obtained from a sizing composition, the resin or resin mixture of which consists substantially of at least one epoxy-type resin whose EEW value is between 150 and 2000, preferably at least 160 and/or at most 700, or even at least 170 and/or at most 300.

It should be noted that, after the binder has cured, the epoxy functional groups have reacted during curing and that amine bridges and alcohol functional groups are observed in the binder that coats the fibers.

Furthermore, the product is white if no colorant has been added.

Advantageously, the thermal and/or acoustic insulation product according to the invention furthermore comprises a web of mineral fibers, especially glass fibers, the grammage of which is, for example, between 10 and 300 g/m², placed on at least one of the outer surfaces of said insulating product. Preferably, said web comprises at least 1%, or at least 2% and even more than 4% by weight of a binder obtained from a sizing composition, the resin or resin mixture of which consists substantially of at least one epoxy-type resin whose EEW value is between 150 and 2000, preferably at least 160 and/or at most 700, or even at least 170 and/or at most 300.

Furthermore, the invention also relates to a process for manufacturing a thermal and/or acoustic insulation product based on mineral fibers, especially glass fibers, that can be used above 150° C., especially between 200 and 500° C., or even up to 700° C. and higher in the case of rock fibers, which comprises the following steps:

a) preparation of a sizing composition consisting substantially of water, a resin or resin mixture consisting substantially of at least one water-dispersible epoxy resin whose EEW value is between 150 and 2000, preferably at least 160 and/or at most 700, or even at least 170 and/or at most 300, at least one amine hardener and additives (in parts calculated per 100 parts of dry resin), especially between 0.1 and 2% of silane and especially between 0 and 15% of a mineral oil;

b) fiberizing, especially by the internal centrifugal process (vertical axis of the spinner, especially for glass fibers) or external centrifugal process (horizontal axis, especially for rock fibers), of a molten mineral composition and spraying of the sizing composition compared in step a) onto the fibers; and c) curing of the sizing composition in an oven, especially at around 250° C., in order to form a compressible fiber blanket.

In a preferred method of implementing the process according to the invention, the sizing composition of step a) comprises a water-dispersible epoxy resin of the glycidyl ether type and an amine hardener whose flashpoint is above 150° C.

Advantageously, in the process according to the invention, at least one aforementioned epoxy resin is a glycidyl ether having a curing index n of less than 1 and preferably less than 0.2.

According to another preferred method of implementation, the sizing composition of step a) comprises a water-dispersible epoxy resin of the novolac type.

It goes without saying that a mixture of the aforementioned resins lies within the scope of the invention.

Preferably, the equivalent molar mass NH of at least one hardener is less than 100 g.

According to a preferred method of implementation, at least one hardener is based on dicyandiamide (DCN).

The invention also relates to the application of the above process to the production of insulating products whose density is between 4 and 200 kg/m³.

The invention also relates to the use of the product described above and/or manufactured by the above process for insulating walls of objects liable to be heated to temperatures of above 150° C., especially between 200 and 500° C., or even up to 700° C. and higher in the case of rock fibers, such as especially walls of ovens, pipes, fire-resistant components, transportation equipment and equipment intended for applications in the nuclear industry.

Other features of the invention are explained in detail below with reference to the comparative tests carried out with sizing compositions A, B, C, D, E corresponding to the following formulations (as is usual, the resin and the catalyst or hardener represents 100 parts in the formulation, and the additives are indicated as additional parts).

COMPARATIVE EXAMPLES A, B AND C

Sizing Composition A

| | |
|---|---|
| phenolic resin | 80 parts |
| urea | 20 parts |
| aminosilane | 0.5 part |
| mineral oil | 9 parts |
| ammonium sulfate | 3 parts |
| aqueous ammonia (20% solution) | 6 parts |

The phenolic resin used for sizing composition A is of the type of those described in patent application EP 0 148 050 and corresponds to that used for the manufacture of standard insulation products.

Sizing Composition B

| | |
|---|---|
| phenolic resin | 100 parts |
| urea | 0 parts |
| aminosilane | 0.5 part |
| mineral oil | 9 parts |
| ammonium sulfate | 3 parts |
| aqueous ammonia (20% solution) | 6 parts |

This sizing composition is of the type of those described in EP 1 022 263 (example no. 1).

Sizing Composition C

| | |
|---|---|
| mineral binder based on aluminum phosphate | 100 parts |
| aminosilane | 0.5 part |
| oil | 9 parts |

EXAMPLES D and E ACCORDING TO THE INVENTION

Sizing Composition D

| | |
|---|---|
| epoxy resin EPIREZ 3510W60 from Resolution | 88 parts |
| DCN (dicyandiamide) hardener | 12 parts |
| 2,4,6-tris(dimethylaminomethyl)-phenol accelerator | 1 part |
| aminosilane | 0.5 part |
| oil | 9 parts |

Sizing Composition E

| | |
|---|---|
| epoxy resin: EPIREZ 3510W60 from Resolution | 80 parts |
| hardener: TEPA | 20 parts |
| aminosilane | 0.5 part |
| oil | 9 parts |

Insulation products were manufactured under identical fiberizing conditions with the above sizing compositions sprayed so that the products contained 4.5% binder by weight.

The gas emission from these products was measured.

The measurement protocol was the following: these sizing compositions were sprayed onto mineral wool fibers, the amount sprayed being the same for all the specimens. A 1 gram sample of each specimen (after the binder had cured) was heated for one hour in a tube furnace at 350° C. with an air flow rate of 2 l/min. The amount of methyl isocyanate (MIC) and of ICA conveyed by the air to the outlet of the furnace was measured according to the OSHA No. 54 standard (MIC trapping on a solid trap impregnated with a reactant that picks up MIC and ICA, followed by a safety bubbler containing the same reactant, and finally quantitative determination of the MIC and ICA by HPLC with UV fluorescence detection. The formaldehyde emissions were measured by the amount of formaldehyde given off by an end product heated to 350° C. in a tube furnace: 10 g of specimen were placed in the tube furnace at 350° C. and a gas stream of reconstituted air was passed through the specimen for one hour; the formaldehyde given off was trapped in two bubblers in series, these being filled with 50 ml of HPLC-quality water; the formaldehyde in each bubbler was measured by the Lange method and the result expressed as formaldehyde (mg) per kg of product. The results of the tests are given in table 1.

TABLE 1

| Sizing composition | Formaldehyde in mg/kg of product | MIC (methylisocyanate) in mg/kg of product | ICA (isocyanic acid) in mg/kg of product |
|---|---|---|---|
| A | 60 | 90 | 140 |
| B | 110 | 18 | 20 |
| C | 8 | 2 | 2 |
| D | 8 | 1.5 | 10 |
| E | 11 | 2 | 8 |

It is clearly apparent that the results obtained with the products according to the invention are remarkable and very substantially different from the known prior art with organic binders.

This is because the products obtained with sizing composition D or E emit less than 20 mg/kg formaldehyde, less than 10 mg/kg MIC and less than 20 mg/kg ICA, whereas no known phenoplast-based solution allows the formaldehyde emissions to reduced to less than 50 mg/kg and MIC emissions to less than 10 mg/kg.

Results are obtained using the solution of the invention that are entirely equivalent to those obtained with mineral binders (example C) as regards gas emissions.

As mentioned above, the drawback of mineral binders relates to the mechanical properties of the products obtained with such binders—the properties are very much inferior to those obtained with organic binders and they also degrade with wet aging.

To illustrate this point, comparative tests are given in table 2 in which the tensile strength measured after manufacture ($TS_{manuf}$) and tensile strength measured after an accelerated aging test, consisting in aging the product for 15 minutes in an autoclave whose temperature was 107° C. at 100% relative humidity ($TS_{15'\ autoclave}$) are indicated for various product densities (about 10 kg/m³ and 35 kg/m³).

The tensile strengths or parting strengths (TS) were measured according to the ASTM C686-71T standard on ring specimens cut by stamping from a product taken after the curing step.

A ring specimen was placed between two cylindrical mandrels of a test machine. One of the mandrels was moved at a constant speed and the force F (in grams force) to break the ring was measured. The tensile strength TS is defined by the ratio F/M, where M is the mass of the specimen (in grams).

The ring specimen used was a torus measuring 122 mm in length and 46 mm in width, the radius of curvature of the cut of the outer edge was 38 mm and that of the internal edge 12.5 mm.

TABLE 2

| Sizing composition | Density (kg/m³) | $TS_{manuf}$ | $TS_{15'\ autoclave}$ |
|---|---|---|---|
| A | 11 | 230 | 114 |
| A | 35 | 350 | 175 |
| C | 32 | 160 | 40 |
| D | 12 | 220 | 80 |
| D | 35 | 370 | 140 |

The results of the mechanical tests prove that, with the products according to the invention (example D), results are obtained that are substantially equivalent (similar, and even sometimes better than) to those with phenophate resins (example A) after manufacture and that remain very satisfactory after an accelerated aging test.

These results show that the mechanical properties of the products according to the invention are greatly superior to those of products manufactured with a mineral binder (example C) after manufacture (a factor of 2 in the results) and after an accelerated aging test (factors of 3 to 4 in the results).

The invention claimed is:

1. A thermal and/or acoustic insulation product, comprising mineral wool and at least 1%, by weight, of a cured organic resin, and further comprising a web of mineral fibers, the grammage of which, is between 10 and 300 g/m², and wherein said web is placed on at least one of the outer surfaces of said insulating product, and wherein said web comprises at least 1%, by weight, of a binder, obtained from a sizing composition, and wherein said composition comprises a resin or resin mixture, comprising at least one epoxy resin, whose EEW value is between 150 and 2000;

and wherein said product releases less than 50 mg/kg (of product) of formaldehyde, and less than 50 mg/kg (of product) of methyl isocyanate (MIC), when it is heated to 350° C. for at least 15 minutes, and wherein the product can be used at temperatures above 150° C.

2. The thermal and/or acoustic insulation product as claimed in claim 1, wherein said product has a density that is between 4 and 200 kg/m$^3$.

3. The thermal and/or acoustic insulation product as claimed in claim 1, wherein the web of mineral fibers comprises glass fibers.

4. A wall section or wall structure, comprising the thermal and/or acoustic insulation product, as claimed in claim 1, and one or more structural components.

5. A method of insulating a wall, comprising inserting the thermal and/or acoustic insulation product as claimed in claim 1, into a space framed by a wall structure.

6. The method of claim 5, wherein said space framed by a wall structure, results from that of an oven, a pipe, a fire-resistant component, a transportation equipment, or an equipment for application in the nuclear industry.

7. A process for manufacturing the thermal and/or acoustic insulation product, as claimed in claim 1, comprising the following steps:
   a) preparing a sizing composition, comprising water, a resin or resin mixture, at least one amine hardener and additives;
   b) fiberizing, by an internal centrifugal process or external centrifugal process, a molten mineral composition, and spraying the sizing composition prepared in step a) onto the fibers; and
   c) curing the sizing composition in an oven to form a compressible fiber blanket, and
   wherein the resin or resin mixture comprises at least one water-dispersible epoxy resin, whose EEW value is between 150 and 2000.

8. The process as claimed in claim 7, wherein the resin of the sizing composition of step a), comprises a water-dispersible epoxy resin of the glycidyl ether type and an amine hardener whose flashpoint is above 150° C.

9. The process as claimed in claim 7, wherein the at least one epoxy resin is a glycidyl ether having a curing index n of less than 1.

10. The process as claimed in claim 7, wherein the at least one epoxy resin of the sizing composition of step a), is based on a water-dispersible epoxy resin of the novolac type.

11. The process as claimed in claim 7, wherein the NH number of the at least one amine hardener is between 20 and 300.

12. The process as claimed in claim 11, wherein the at least one amine hardener is selected from aliphatic amines, cycloaliphatic amines, aromatic amines, imidazoles, polyfunctional hydrazides, dicyandiamide (DCN), or mixtures thereof.

13. The process as claimed in claim 7, and wherein the additives comprise between 0.1 and 2% of silane and between 0 and 15% of a mineral oil.

14. A thermal and/or acoustic insulation product, comprising mineral wool and comprising at least 1%, by weight, of a binder, obtained from a sizing composition, and wherein said composition comprises a resin or resin mixture, comprising at least one epoxy resin, whose EEW value is between 150 and 2000, and
   wherein said product further comprises a web of mineral fibers, the grammage of which is between 10 and 300 g/m$^2$, and wherein said web is placed on at least one of the outer surfaces of said insulating product, and wherein said web comprises at least 1%, by weight, of a binder, obtained from a sizing composition, and wherein said composition comprises a resin or resin mixture, comprising at least one epoxy resin, whose EEW value is between 150 and 2000.

* * * * *